(12) United States Patent
Enyedi et al.

(10) Patent No.: US 9,614,720 B2
(45) Date of Patent: Apr. 4, 2017

(54) NOTIFICATION TECHNIQUE FOR NETWORK RECONFIGURATION

(71) Applicant: Telefonaktiebolaget L M Ericsson (publ), Stockholm (SE)

(72) Inventors: Gabor Sandor Enyedi, Budapest (HU); András Császár, Telki (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/782,692

(22) PCT Filed: Dec. 20, 2013

(86) PCT No.: PCT/EP2013/077653
§ 371 (c)(1),
(2) Date: Oct. 6, 2015

(87) PCT Pub. No.: WO2014/166560
PCT Pub. Date: Oct. 16, 2014

(65) Prior Publication Data
US 2016/0094380 A1 Mar. 31, 2016

Related U.S. Application Data

(60) Provisional application No. 61/810,016, filed on Apr. 9, 2013.

(51) Int. Cl.
*H04L 12/26* (2006.01)
*H04L 12/24* (2006.01)
(Continued)

(52) U.S. Cl.
CPC .......... *H04L 41/0654* (2013.01); *H04L 12/18* (2013.01); *H04L 41/0813* (2013.01);
(Continued)

(58) Field of Classification Search
None
See application file for complete search history.

(56) References Cited

U.S. PATENT DOCUMENTS 8,693,323 B1 * 4/2014 McDysan ............... H04L 45/50
370/230
8,824,276 B2 * 9/2014 Csaszar .................. H04L 45/22
370/218
(Continued)

FOREIGN PATENT DOCUMENTS

WO 2012000557 A1 1/2012

OTHER PUBLICATIONS

Winjnands, IJ, et al., "Tree Notification to Improve Multicast Fast Reroute", Routing Working Group, Internet-Draft, Oct. 15, 2012, pp. 1-13, IETF.
(Continued)

*Primary Examiner* — Anh-Vu Ly
(74) *Attorney, Agent, or Firm* — Coats and Bennett, PLLC

(57) ABSTRACT

A technique for informing nodes in a communications network about changes in a state of the communications network using notification packets is described. In that technique, the communications network is reconfigured using a fast reroute protocol responsive to the state change. A method aspect of the technique comprises generating, upon a network state change, a notification packet. Generating the notification packet includes adding a unique identifier to the notification packet. The method further includes propagating the notification packet through the communications network.

23 Claims, 7 Drawing Sheets

(51) Int. Cl.

| | |
|---|---|
| *H04L 29/06* | (2006.01) |
| *H04L 12/18* | (2006.01) |
| *H04L 12/761* | (2013.01) |
| *H04L 12/707* | (2013.01) |
| *H04L 12/703* | (2013.01) |

(52) U.S. Cl.
CPC ............ *H04L 45/16* (2013.01); *H04L 45/22* (2013.01); *H04L 45/28* (2013.01); *H04L 63/12* (2013.01)

(56) References Cited

U.S. PATENT DOCUMENTS

| | | | | |
|---|---|---|---|---|
| 2006/0209682 | A1* | 9/2006 | Filsfils | H04L 45/04 370/219 |
| 2009/0287929 | A1* | 11/2009 | Kolesnikov | H04L 9/0844 713/171 |
| 2010/0302935 | A1* | 12/2010 | Zhang | H04L 45/02 370/218 |
| 2011/0273980 | A1* | 11/2011 | Ashwood Smith | H04L 45/00 370/225 |
| 2012/0213078 | A1* | 8/2012 | Kitada | H04L 47/17 370/236 |
| 2013/0089094 | A1* | 4/2013 | Csaszar | H04L 45/00 370/390 |

OTHER PUBLICATIONS

Csaszar, A., "IP Fast Re-Route with Fast Notification", Network Working Group Internet Draft, Feb. 25. 2013, pp. 1-28, IETF.

Lu, W., et al., "Transport of Fast Notification Messages", Network Working Group Internet-Draft, Feb. 25, 2013, pp. 1-24, IETF.

* cited by examiner

NOTIFICATION TECHNIQUE FOR NETWORK RECONFIGURATION

TECHNICAL FIELD

The present disclosure generally relates to packet-switched communications networks. In particular, the disclosure relates to a technique for informing nodes in a communications network about changes in a state of the communications network using notification packets. The technique may be embodied in one or more of methods, computer programs, and network nodes.

BACKGROUND

Unicast or multicast traffic in a packet-switched network can be protected against failures using notification packets. In case of a change in the packet-switched network, a reconfiguration (rerouting) is needed, which should be as fast as possible.

Several Fast Reroute (FRR) protocols are known for reconfiguring a network responsive to a change in the network topology. Exemplary FRR procedures are described in I J. Wijnands, A. Császár, "Tree Notification to Improve Multicast Fast Reroute", internet draft, available online: http://tools.ietf.org/html/draft-wijnands-rtgwg-mcastfrr-tn-00, Oct. 15, 2012 ("Wijnands"); and A. Császár, G. Enyedi, J. Tantsura, S. Kini, 3. Sucec, S. Das, "IP Fast Re-Route with Fast Notification", Internet draft, available online: http://tools.ietf.org/html/draft-csaszar-rtgwg-ipfrr-fn-01, Feb. 25, 2013 ("Császár"). These references are incorporated herein in their entirety by reference.

The FRR procedures described in Wijnands and Császár propagate a failure notification packet through the network, which can be processed and forwarded by linecards at each network node without control plane involvement. Because the control plane is not involved, failure reaction can be significantly faster than traditional approaches. FRR using notification packets is especially useful for protecting multicast traffic.

A common problem of notification packets is that a malicious attacker may record the notification packet and inject replayed notification packets into the communications network, thus causing an unnecessary or even harmful reconfiguration of the network. It has been found that replay attacks can occur even when notification packets are digitally signed or encrypted to prevent injection of malicious notifications.

For unicast traffic, one solution for protecting notification packets against replay and other attacks is to use an Interior Gateway Protocol (IGP), such as the Open Shortest Path First (OPSF) protocol or Intermediate System to Intermediate System (ISIS) protocol, to create a hash value from a link state database. Since the link state database should be global in a stable state and should change after each failure, this hash value can be used in a global sequence number. This solution is not available if there is no link state database, which is typically the case with multi-cast routing protocols.

The IPsec protocol uses a sequence number for all possible sources. This solution scales well because a limited number of nodes is communicating with each other at a time. Although it is problematic with IPsec, it is possible to keep up one sequence number per node, but this approach would result in communication with all of the network nodes. Typically with IPsec, each network node is communicating with only a small portion of the nodes in the network. As an example, Protocol Independent Multicast (PIM) uses IPsec for communicating only with an immediate neighbor. If there is a need to communicate with another node, the node needs to set up a new connection and agree on a sequence number. For FRR procedures, there usually is insufficient time for such synchronization.

Another possible solution to combat replay and other attacks is for each node to maintain a sequence number for all other nodes in the network, which would require that each node communicates with the other nodes in the network. This solution, however, makes scaling more difficult. With protocols such as PIM and the Routing Information Protocol (RIP), scaling would be easier because each node is communicating only with its neighboring nodes.

SUMMARY

Accordingly, there is a need for a secure implementation of a notification packet-based FRR procedure.

According to one aspect, a method of informing nodes in a communications network about changes in a state of the communications network using notification packets is presented, wherein responsive to a state change the communications network is reconfigured using a fast reroute protocol. The method comprises generating, upon a state change, a notification packet, wherein generating the notification packet includes adding a unique identifier to the notification packet. The method further comprises propagating the notification packet through the communications network.

The communications network may be a multicast network for content distribution. As understood herein, multicast may also comprise broadcast. The communications network may have a tree structure (e.g., in the form of a multicast tree). A root of the tree may be defined by a content source, and leaves of the tree may be defined by content recipients. The communications network may comprise multiple network nodes between the content source and the content recipient. One or more of those network nodes may perform the unique identifier handling aspects presented herein.

The unique identifier may ensure that the content of the notification packet is unique to avoid replay attacks. In such attacks, replayed notification packets are injected into the communications network. Of course, the unique identifier may also be exploited to avoid other unauthorized uses of the notification packet.

The unique identifier may be different for each notification packet. Additionally, or alternatively, the unique identifier may be different after each network reconfiguration process. As such, each reconfiguration process may "consume" a unique identifier and trigger generation of a new unique identifier at one or more network nodes. Each notification packet, in turn, may be intended to trigger such a reconfiguration process in accordance with an FRR protocol.

The unique identifier may be a sequence number that is incremented each time a notification packet is generated. Alternatively, the unique identifier comprises an arbitrary number (e.g., a random number) "nominally" different for each notification packet.

Each network node in the communications network may have its own unique identifier. Further, each network node may determine its own unique identifier itself and independently from the other network nodes.

In a network realization with multiple hops, the unique identifier may be replaced at every hop. As will be appreciated, each hop may correspond to a dedicated network node with a dedicated unique identifier. There is, however, no need that the unique identifier is replaced at a particular hop with the unique identifier associated with the network node corresponding to that hop. Rather, also the unique identifier of another network node may be added to the notification packet in this regard.

A network node may keep (e.g., store) the unique identifiers of neighbouring network nodes. The neighbouring network nodes may be immediate or indirect neighbours. The method also comprises in one variant the step of communicating with neighbouring nodes to exchange or synchronize the unique identifiers.

In the communications network dedicated network node areas may be defined for various purposes. In one variant, a network node communicates with other network nodes in the same area to exchange or synchronize the unique identifiers.

The method may further comprise signing the notification packet and/or encrypting the notification packet. Any of those steps may be performed after the unique identifier has been added to the notification packet.

The notification packet may comprise a header and a payload. The unique identifier is in one variant included in the payload. The payload optionally further includes a node identifier different from the unique identifier. The node identifier may identify the network node that generates, signs or encrypts the notification packet. The notification packet may, for example, conform to Internet Protocol (IP) v4 or v6.

In implementations in which each network node has its own unique identifier, the unique identifier added to the notification packet is in one variant the unique identifier of the network node generating the notification packet. In another variant, the unique identifier added to the notification packet is the unique identifier of another network node (e.g., of a repair node downstream of the notification packet generating node).

According to a further aspect, a method of informing nodes in a communications network about changes in a state of the communications network using notification packets is provided, wherein responsive to a state change the communications network is reconfigured using a fast reroute protocol. The method comprises receiving, by a first network node and from a second network node, a notification packet, wherein the notification packet includes a first unique identifier. The method also comprises verifying, by the first network node, the first unique identifier contained in the notification packet. If the first unique identifier is valid, the method further comprises replacing, by the first network node, the first unique identifier in the received notification packet with a second unique identifier and forwarding the notification packet to a third network node.

If, on the other hand, the first unique identifier is not valid, the method may comprise discarding the received notification packet. As such, replayed notification packets with invalid unique identifiers will not cause any harm and, in particular, will not trigger a network reconfiguration according to the FFR protocol.

The received notification packet can be at least one of signed and encrypted by the second network node. The method according to the further aspect could thus comprise verifying at least one of a signature and an encryption of the second network node, and discarding the received notification packet if at least one of the signature and the encryption is not valid.

Each network node may have its own unique identifier. As an example, the first unique identifier is associated with the second network node and the second unique identifier is associated with the first network node. As another example, the first unique identifier is associated with the first network node and the second unique identifier is associated with the third network node.

Also provided is a computer program product comprising program code for performing the steps of any of the methods and method aspects described herein when the computer program product is run on one or more processing circuits. The computer program product may be stored on a computer-readable recording medium such as a DVD, CD-ROM or semiconductor memory. The computer program product may also be provided for download via a communications network.

According to a first hardware aspect, a network node adapted to inform nodes in a communications network about changes in a state of the communications network using notification packets is provided, wherein responsive to a state change the communications network is reconfigured using a fast reroute protocol. The network node is adapted to generate, upon a state change, a notification packet, wherein generating the notification packet includes adding a unique identifier to the notification packet. The network node is further adapted to propagate the notification packet through the communications network.

According to a second hardware aspect, a first network node adapted to inform other nodes in a communications network about changes in a state of the communications network using notification packets is provided, wherein responsive to a state change the communications network is reconfigured using a fast reroute protocol. The first network node is adapted to receive, from a second network node, a notification packet, wherein the notification packet includes a first unique identifier, and to verify the first unique identifier contained in the notification packet. If the first unique identifier is valid, the first network node replaces the first unique identifier in the received notification packet with a second unique identifier and forwards the notification packet to a third network node.

A network system comprising the above network nodes is provided also. The network system may comprise a multicast network with a content source and content recipients.

Still further, a data structure for a notification packet adapted to inform nodes in a communications network about changes in a state of the communications network is provided, wherein responsive to a state change the communications network is reconfigured using a fast reroute protocol. The data structure includes a unique identifier for the notification packet.

DETAILED DESCRIPTION

Figure 1:
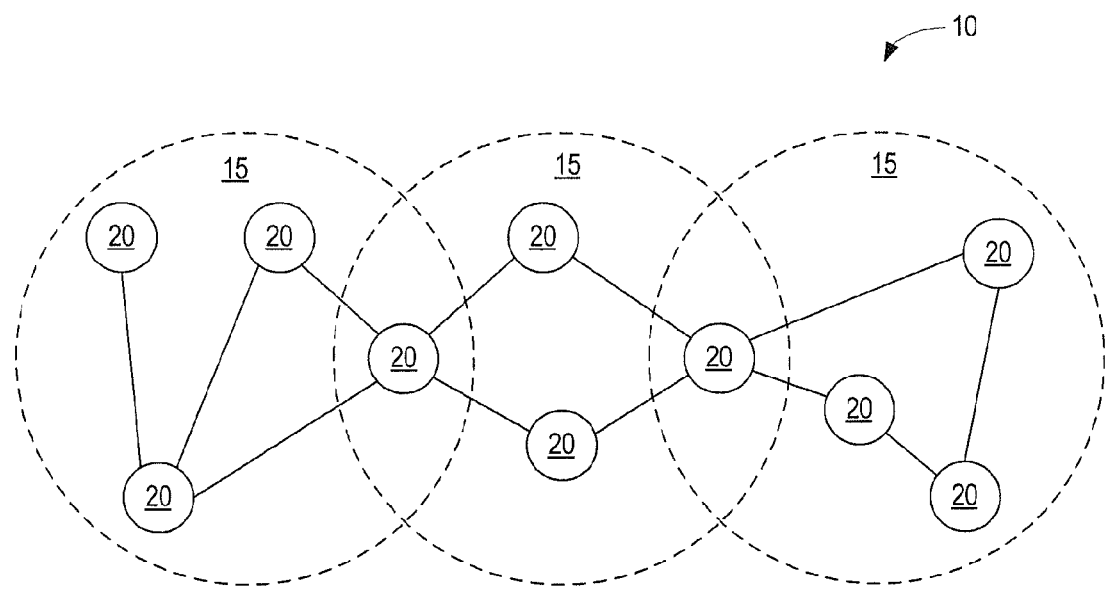
FIG. 1 illustrates an exemplary network according to an embodiment of the present disclosure.

In the following description, for purposes of explanation and not limitation, specific details are set forth (such as particular protocols, network functions, processes and signalling steps) in order to provide a thorough understanding of the technique presented herein. It will be apparent to one skilled in the art that the present technique may be practiced in other embodiments that depart from these specific details. For example, some embodiments will be described in the technical context of the Wijnands and Császár references mentioned above. While the present disclosure can be implemented in connection with the FRR procedures and network scenarios described by Wijnands and Császár, this does not rule out an implementation of the present disclosure in other FRR procedures and other network scenarios. Further, while in the following description mainly network link or network node failures will be considered as examples for network state changes that trigger the propagation of notification packets, it will be appreciated that network state changes can also result from intentional network management actions.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

The following embodiments relate to methods and apparatuses that use notification packets sent to inform remote network nodes in a communications network about changes in the state of the network (typically about a failure of a network node). It has been found that replay attacks and other unauthorized uses of notification packets can occur even when the notification packets are digitally signed or encrypted to prevent injection of malicious notifications. The following embodiments present solutions for ensuring that the content of each notification packet is unique, and thus help to counter replay attacks and other unauthorized uses of notification packets.

Re-use of a notification packet in a replay attack or in any other unauthorized way is in the embodiments prevented by adding extra information into the notification packet to ensure that each notification packet is unique. The required uniqueness may be achieved by adding to each notification packet a unique identifier (ID). The unique ID may be a sequence number that is incremented each time a notification packet is generated. Alternatively, the unique ID may comprise an arbitrary number generated by a network node so long as the unique ID is different for each notification packet.

Exemplary embodiments of the invention comprise methods implemented by a first network node in a communication network of protecting notification packets against replay attacks and other unauthorized uses. In one exemplary method, the network node receives, from a second network node, a notification packet containing a first unique ID. The network node verifies the unique ID contained in the notification packet. If the first unique ID is valid, the network node replaces the first unique ID in the received notification packet with a second unique ID and forwards the notification packet to a third network node.

In some embodiments, the method further comprises discarding the notification packet if the unique ID is not valid. In some embodiments, the packet is signed by the second network node and the method further comprises verifying the signature of the second network node, and the method further comprises discarding the notification packet if the signature is not valid. In some embodiments, the packet is encrypted by the second network node and the method further comprises verifying the encryption by the second network node, and the method further comprises discarding the notification packet if the encryption is not valid. Those embodiments can, of course, be combined as needed.

In some embodiments, each network node has its own unique ID and the unique ID is replaced at every hop. In this embodiment, the first unique ID is associated with the second network node and the second unique ID is associated with the first network node. The method comprises replacing the first unique ID associated with the second network node with the second unique ID associated with the first network node.

In some embodiments, the first and third network nodes belong to first and second areas, respectively, of the communication network. The first and second unique IDs are preferably associated with the first and second areas, respectively. The first network node may belong to both areas. When the third network node belongs to a different area than the second network node, the first network node is configured to replace the unique ID associated with the first area with the unique ID associated with the second area.

Other embodiments of the disclosure comprise a network node in a packet-switched network. One exemplary network node comprises communication circuits for communicating with other network nodes in the communication network, and processing circuits connected to the communication circuits for processing packets received by the network node. The processing circuits are preferably configured to receive, from a second network node via said communication circuit, a notification packet containing a first unique ID and to verify the unique ID contained in the notification packet. The processing circuits are preferably further configured to replace the first unique ID in the received notification packet with a second unique ID if the first unique ID is valid, and to forward the notification packet to a third network node.

In some embodiments, the processing circuit is further configured to discard the notification packet if the unique ID is not valid. In some embodiments, the notification packet is signed by the second network node and wherein the processing circuit is further configured to verify the signature of the second network node, and discarding the notification packet if the signature is not valid.

In some embodiments, each network node has its own unique ID and the unique ID is replaced at every hop. In this embodiment, the first unique ID is associated with the second network node and the second unique ID is associated with the first network node. The processing circuit is further configured to replace the first unique ID associated with the second network node with the second unique ID associated with the first network node.

In some embodiments, the first and third network nodes belong to first and second areas respectively of the communication network. The first and second unique IDs are associated with the first and second areas, respectively. The first network node may belong to both areas. When the third network node belongs to a different area than the second network node, the processing circuit is further configured to replace the unique ID associated with the first area with the unique ID associated with the second area Referring to FIG. 1, an exemplary communications network 10 is shown. The communications network 10 comprises ten network nodes 20, such as routers or switches, for routing data traffic through the network 10. In the exemplary embodiment, the network 10 is divided into a plurality of small areas 15. As one example, an area 15 may comprise two network nodes 20 connected by a single link. A network node 20 may be a member of multiple areas 15. For example, a network node 20 at the border between two areas 15 may be a member of each neighboring area 15.

The grouping of network nodes 20 into areas 15 is, however, not required. In other words, at least some variants of the present disclosure can also be implemented in the communications network 10 when the network 10 is not divided into individual areas. On the other hand, the area concept presented herein could also be combined with notification packet-based FRR procedures in general (e.g., in connection with the FRR procedures described in the Wijnands and Császár references mentioned above), and independently from using the unique identifier concept. In other words, the area concept may also be used in connection with conventional notification packets that do not include a unique identifier.

The exemplary communications network 10 uses an FFR protocol to reconfigure the network 10 responsive to a change in the network state. For example, the network nodes 20 may be configured to implement the FFR protocols as described in the Wijnands and Császár references mentioned above.

When the network state changes, such as when a failure occurs at one of the network nodes 20, a notification packet is generated and propagated through the network 10. To prevent the use of the notification packet in a replay attack or in another unauthorized way, extra information is inserted into the notification packet to ensure that each notification packet is unique. In one exemplary embodiment, the required uniqueness is achieved by adding to each notification packet a unique ID. In some embodiments, a digital signature or packet encryption may also be used to prevent a malicious third party from injecting false notification packets.

The unique ID may be a sequence number that is incremented each time a notification packet is generated. Alternatively, the unique ID may comprise an arbitrary number generated by a network node 20 so long as the unique ID is different for each notification packet.

In some embodiments, each network node 20 in the network 10 has its own unique ID. In this case, each network node 20 communicates with its neighboring network nodes 20 to exchange or synchronize the unique IDs. Thus, each network node 20 knows the unique ID of its neighboring network nodes 20.

In one embodiment, each network node 20 communicates with other network nodes 20 in the same area 15 to exchange or synchronize the unique IDs. If a network node 20 is a member of two different areas 15, the network node 20 communicates with the network nodes 20 in each area 15.

Thus, each network node 20 knows the unique IDs of the other network nodes 20 in any area 15 to which it belongs.

In other embodiments, the network nodes 20 within an area 15 may agree on a unique ID that is used by all network nodes 20 in the same area 15. If a network node 20 is a member of two different areas 15, it knows the unique ID for each area 15 to which it belongs.

Figure 2:
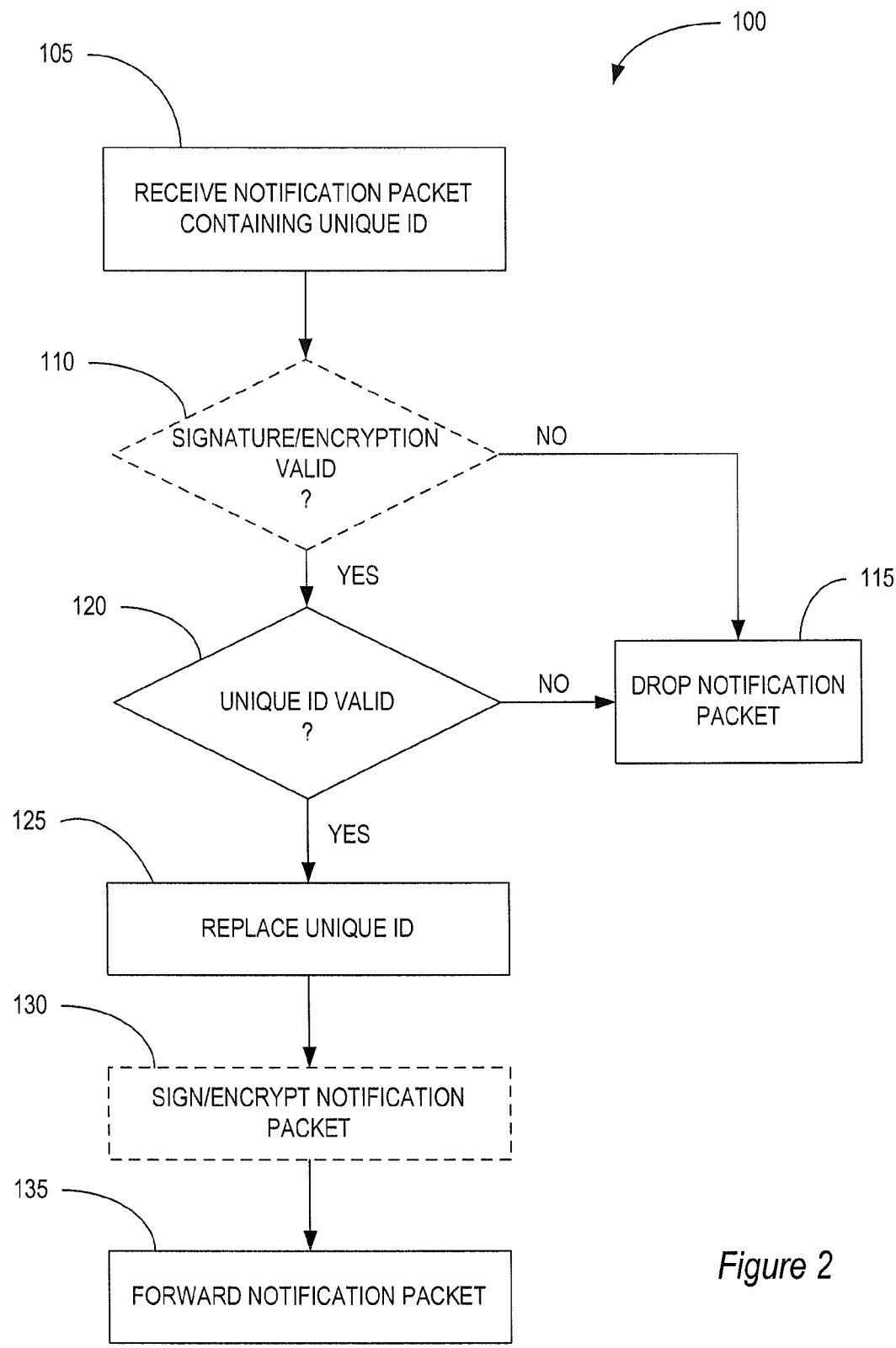
FIG. 2 illustrates an exemplary method according to an embodiment of the present disclosure.

FIG. 2 illustrates an exemplary method 100 according to one embodiment of the present disclosure. The method steps shown in dotted lines are optional. In this embodiment, it is assumed that each network node 20 has its own unique ID.

The method 100 begins when the network node 20 receives a notification packet (block 105). Typically, the notification packet is encrypted and/or signed by another network node 20 in the network 10. The signing or encryption of notification packets, however, is not required. If the notification packet is signed or encrypted, the receiving network node 20 verifies the notification packet by validating the signature applied to the notification packet and/or decrypting the packet (block 110). If the signature is not valid, or the notification packet cannot be decrypted, the packet is dropped (block 115).

The network node 20 then checks whether the unique ID in the received notification packet is correct (block 120). If the unique ID is not correct, the notification packet is dropped (block 115). If the unique ID is correct, the network node 20 replaces the unique ID in the received notification packet with its own unique ID (block 125). The network node 20 then signs/encrypts the notification packet (block 130), and forwards the notification packet to the next network node 20 (block 135). If the notification packet is multicasted, the unique ID should be replaced in each outgoing copy of the notification packet (block 125). Also each copy of the notification packet should be signed/encrypted (block 130) before it is forwarded (block 135).

Figure 3:
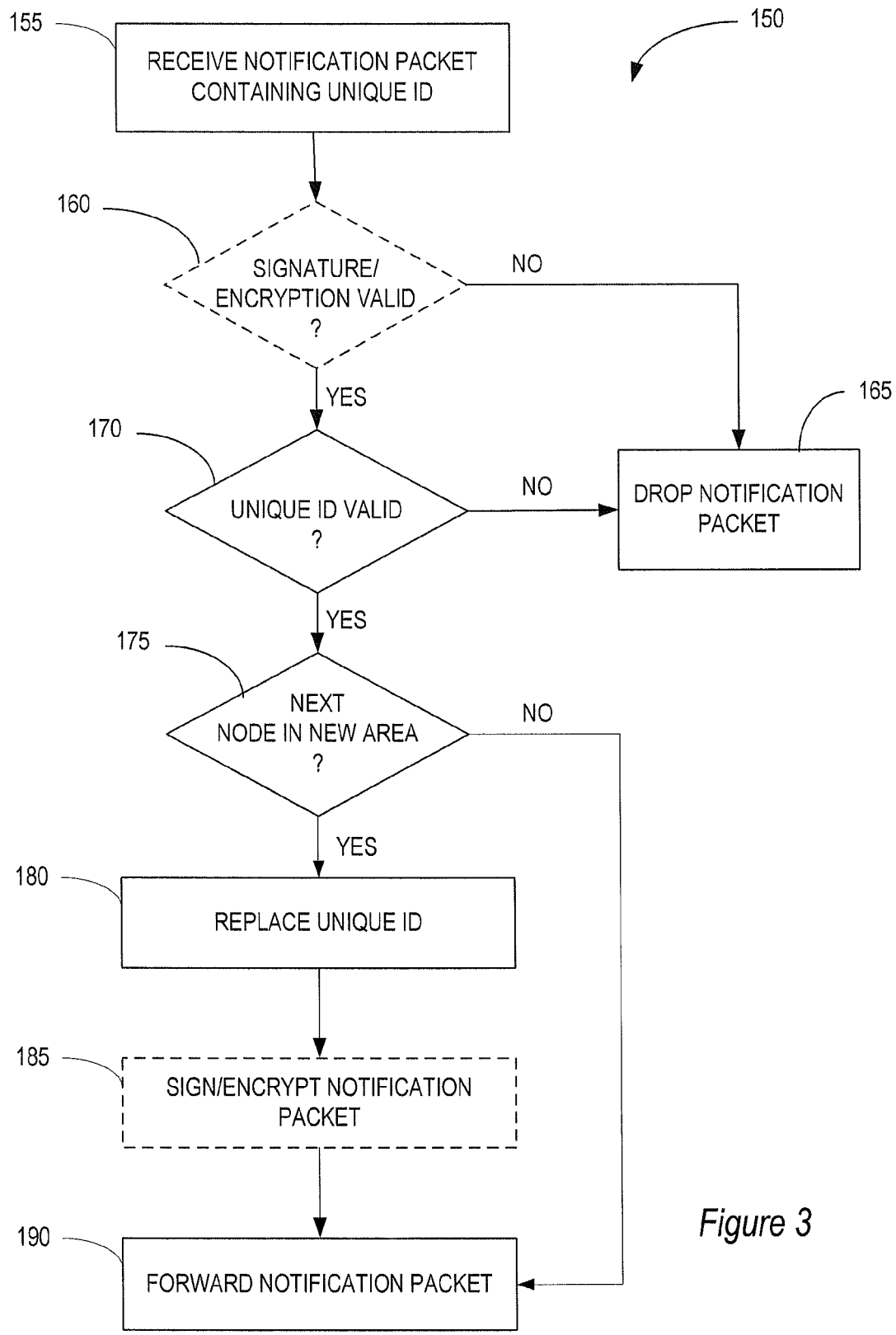
FIG. 3 illustrates an exemplary method according to an embodiment of the present disclosure.

FIG. 3 illustrates an exemplary method 150 according to another embodiment where the network 10 is divided into a plurality of areas 15, each comprising two or more network nodes 20. The method steps shown in dotted lines are optional. In this embodiment, the network nodes 20 may each have a unique ID. Alternatively, the network nodes 20 in each area 15 may agree on a single unique ID for all network nodes 20 within the area 15.

The method 150 begins when the network node 20 receives a notification packet (block 155). Typically, the notification packet is encrypted and/or signed by another network node 20 in the same areas 15. The signing or encryption of notification packets, however, is not required.

If the packet is signed or encrypted, the receiving network node 20 verifies the notification packet by validating the signature applied to the notification packet and/or decrypting the packet (block 160). If the signature is not valid, or the notification packet cannot be decrypted, the notification packet is dropped (block 165).

The network node 20 then checks whether the unique ID in the received notification packet is correct (block 170). If the unique ID is not correct, the notification packet is dropped (block 165). If the unique ID is correct, the network node 20 checks whether the next network node 20 is in the same area 15 (block 175). If so, the network node 20 replaces the unique ID in the received notification packet with its own unique ID (block 180). The network node 20 may then sign and/or encrypt the notification packet (block 185), and forward the notification packet to the next network node 20 (block 190). If the next node 20 is not in a new area 15, the network node 20 forwards the received notification packet without change (block 180). If the notification packet is multicasted, the unique ID should be replaced in each copy of the notification packet that is being forwarded to a new area 15 (block 180). Also each copy of the notification packet being forwarded to a new area 15 should be signed/encrypted (block 185) before it is forwarded (block 190).

The size of the areas 15 may be arbitrary. In one exemplary embodiment, each area 15 contains two network nodes 20 connected by a single link. This solution scales extremely well because a network node 20 needs to know the unique ID for only its neighboring network nodes 20. Also, computing the signature/encryption is not a time-consuming operation.

Figure 4:
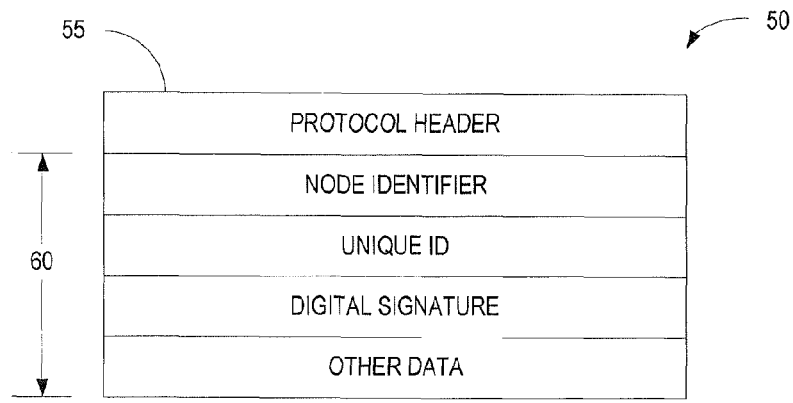
FIG. 4 illustrates the message format of an exemplary notification message according to an embodiment of the disclosure.

FIG. 4 illustrates an exemplary notification packet 50 that can be used in connection with all the embodiments presented herein. The notification packet 50 comprises a header 55 and a payload 60. The payload 60 comprises a node identifier information element (IE) to identify the network node 20 that signs or encrypts the notification packet, a unique ID IE containing the unique ID of a network node 20 as herein described, an optional digital signature IE including the digital signature of the network node 20 signing the notification packet, and a data IE for containing other data.

It will be appreciated that the node identifier and unique ID IEs are not the same. The node identifier of a network node does not change and will be the same for each notification packet signed or encrypted by the network node 20. The unique ID, in contrast, will be different for each notification packet forwarded by the network node 20.

Figure 5:
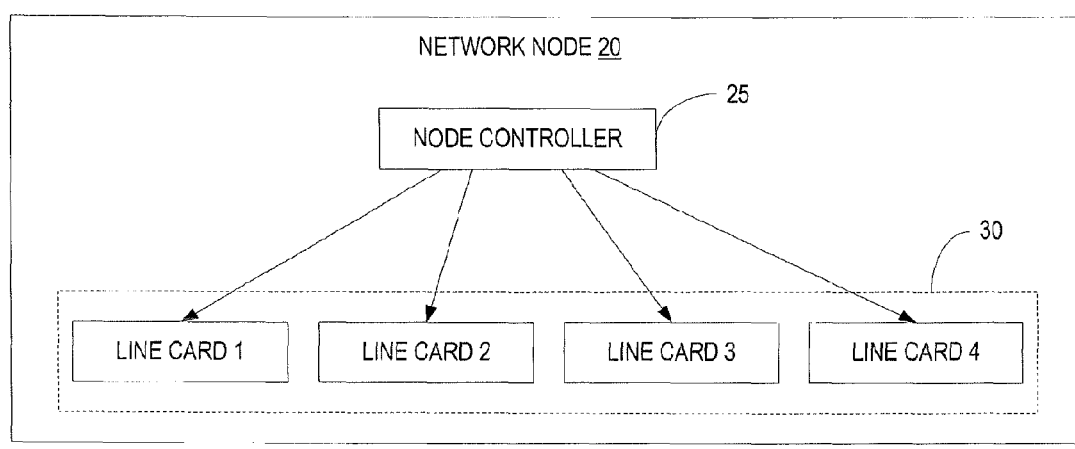
FIG. 5 illustrates an exemplary network node including multiple line cards for routing in the data plane.

FIG. 5 illustrates the architecture of an exemplary network node 20 in one exemplary embodiment. The network node may perform any of the method embodiments presented herein.

The network node 20 comprises node controller 25 for controlling the operation of the network node 20 and data circuits 30 for processing data. In one exemplary embodiment, the data circuits 30 may comprise one or more line cards that are configured by the node controller 25. In some embodiments, each network node 20 includes its node controller 25. In other embodiments, a centralized node controller 25 may provide control for two or more network nodes 20.

Figure 6:
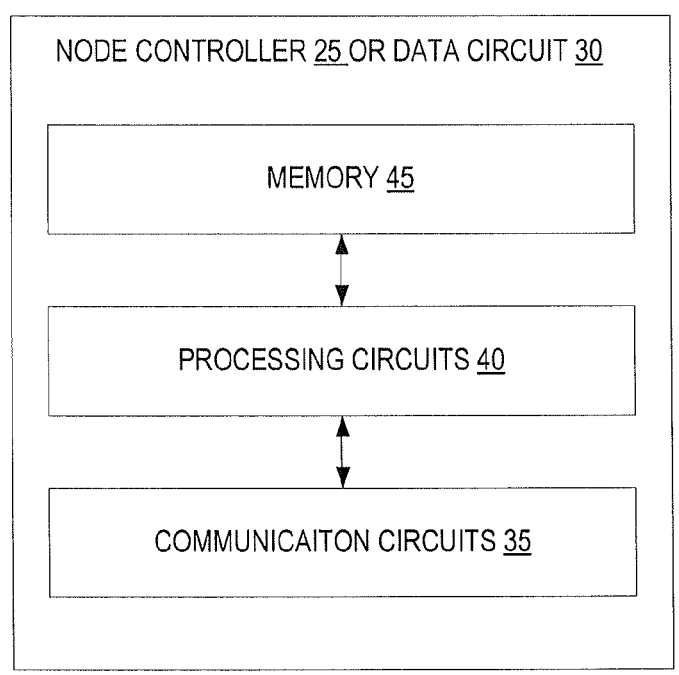
FIG. 6 illustrates the main functional components of an exemplary line card.

FIG. 6 illustrates the main functional elements of an exemplary node controller 25 or data circuit 30 (e.g. line card). The node controller 25, or data circuit 30, comprises communication circuits 35, processing circuits 40, and memory 45. The communication circuits 35 comprises a network interface circuit for connecting to the communication network 10 and communicating with other network nodes 20, and manmachine interfaces. The network interface circuit may, for example, comprise an Ethernet interface or wireless interface. The processing circuits 40 comprise one or more microprocessors, hardware, firmware or a combination thereof. Memory 45 comprises non-volatile memory, such as read-only memory, for storing program instructions and data required for operation. Memory 45 may also comprise volatile memory such as random access memory for temporarily storing data for processing.

The technique presented herein can be employed in a communications network (e.g., as the network 10 of FIG. 1) to address failures and other network state changes that require a network reconfiguration in accordance with an FRR procedure (i.e., triggered on a data plane). In this regard an individual network node needs to detect the failure in a first step and then take appropriate action by generating a notification packet that includes the unique identifier. In a further step, the notification packet is propagated on the dat plane through the communications network.

The communications network may generally have a tree structure in which primary paths and secondary (or backup) paths are defined. Such a tree structure may in one variant be represented by a multicast tree. Notification packets may be propagated on both primary and secondary paths.

In case of a failure that blocks a primary path, an appropriate secondary path needs to be activated, or unblocked. The activation of the appropriate secondary path may be triggered via one or more notification packets propagated through the communications network. In this regard, repair nodes may be defined that are configured to switch network traffic from the primary path to the secondary path responsive to receipt of a notification packet (and, optionally, responsive to application of further rules to conditionally unblock the secondary path upon receipt of a notification packet). Each of the repair nodes may belong to both a primary path and at least one secondary path.

Different strategies for notification packet generation and propagation may be defined dependent on whether an upstream or a downstream node is to be notified of a failure. Generally, an upstream notification packet (UNP) may be generated and propagated or a downstream notification packet (DNP) may be generated and propagated. In this regard, one embodiment of the present disclosure is configured in accordance with the Wijnands reference, where UNPs are also referred to as Upstream Tree Notification (UTN) packets, and DNPs as Downstream Tree Notification (DNP) packets. As for the generation and propagation of UNPs/UTN packets and DNPs/DTN packets, reference is thus made to the Wijnands reference, and its corresponding teachings are herewith incorporated.

As described above, notification packet handling in an individual network node may differentiate between uplink notifications (UNPs/UTN packets) and downlink notifications (DNPs/DTN packets). Such differences may in particular apply to the type of unique identifier added to UNPs/UTN packets and DNPs/DTN packets. As an example, a network node originating the UNPs/UTN packets may add a unique identifier associated with that node. The node may have previously informed one or more upstream nodes of its unique identifier to enable a proper handling of the UNPs/UTN packets received by those upstream nodes. In a similar manner, a network node originating the DNPs/DTN packets may add a unique identifier associated with a downstream repair node. The downstream repair nodes may have have previously informed their upstream nodes of the unique identifiers associated with the repair nodes.

In certain embodiments, the technique presented herein may comprise propagating unique identifiers of individual network nodes (e.g., failure detecting nodes and/or repair nodes) prior to propagation of the notification packets. The propagation of the unique identifiers may be performed in a "learning phase". Such a learning phase may be repeated (i.e., new unique identifiers may be generated and propagated) after each network failure (e.g., after each use of a unique identifier). It should be noted that generation of the unique identifiers need not necessarily be synchronized among the network nodes. Rather, each node may have its own, independent generation rule.

In one exemplary realization, the unique identifiers may be propagated in Join Messages (JMs) during the learning phase. JMs can be used to join a multicast tree (i.e., to build up the tree). In PIM, so called JOIN messages are used to that end, whereas in the Multi-point Label Distribution Protocol (mLDP) so called Label Mapping messages are defined in this regard. Alternatively, or in addition, the unique identifiers may be propagated as part of Repair Node Information (RNI). The RNI may be propagated in the notification packets (UNPs/UTN packets and/or DNPs/DTN packets).

Figure 7:
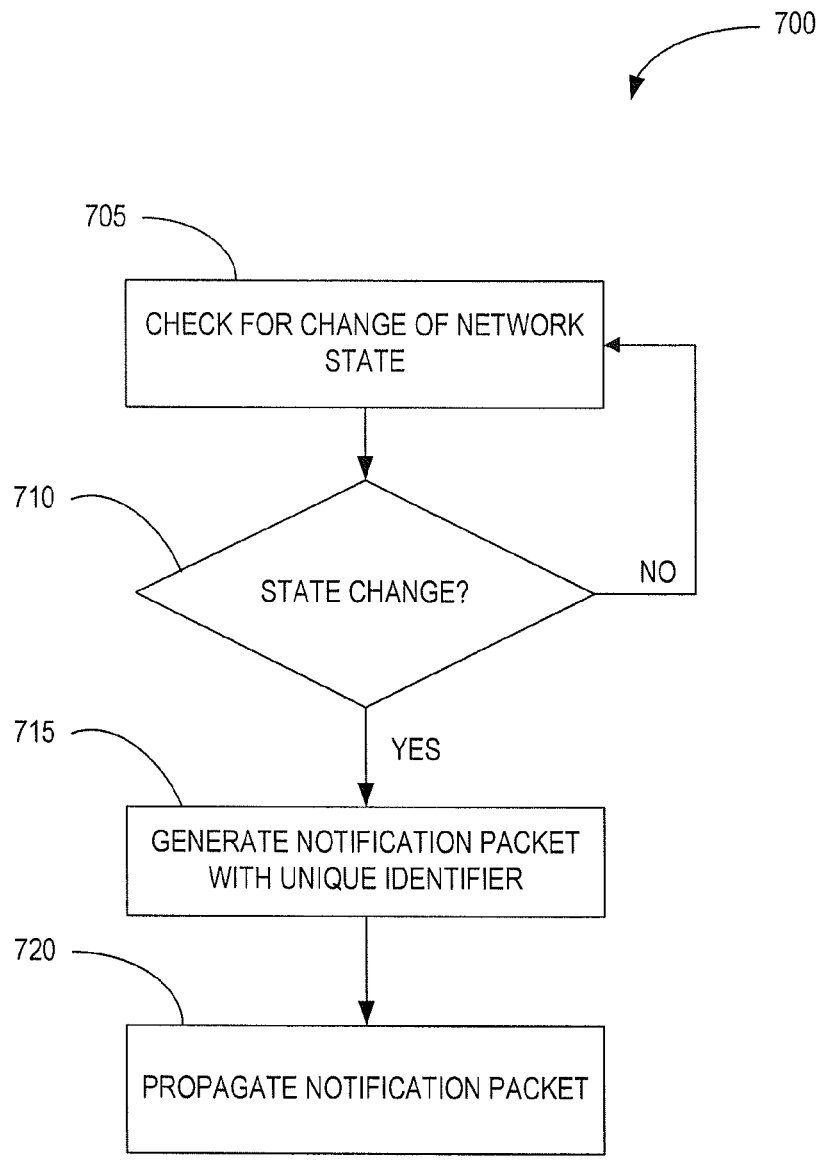
FIG. 7 illustrates an exemplary method according to an embodiment of the present disclosure.

FIG. 7 illustrates another exemplary method 700 according to one embodiment of the present disclosure. The method 700 may performed in the (FRR enabled) network 10 of FIG. 1 by a network node 20 as illustrated in FIG. 5 and based on the exemplary notification packet 50 of FIG. 4. It will be appreciated that the method 700 could alternatively be performed in other network scenarios, using other network node configurations, or with different notification packet formats. Moreover, the method 700 could be combined with the area concept explained above.

The method 700 begins with the network node 20 checking for changes of the network state (block 705). Typically, the network node 20 will monitor potential failures of its neighbouring nodes as well as of the network links to its neighbouring network nodes in this regard. The network node 20 continuously checks the network state to see if changes can be detected that would need a network reconfiguration by an FRR protocol (block 710). If no changes can be detected, the method 700 loops back to back to block 705.

If, on the other hand, a network state change can be detected in block 710, the method 700 continues with generating a notification packet (block 715). Generating the notification packet includes adding a unique identifier to the notification packet.

It will be appreciated that the notification packet generated in block 715 may be signed by the network node 20 may fail generating the notification packet. Alternatively, or in addition, the notification packet may be encrypted. Then, in block 720, the generated notification packet with the unique identifier is propagated through the communications network 10 to one or more other network nodes 20.

In blocks 705 and 710 a remote, non-local failure further upstream of the network node 20 performing the method 700 may be detected as the network state change. As an example, a link to a neighbouring upstream node 20 or the neighbouring upstream node 20 may fail itself. The upstream node 20 may be on the primary path from the perspective of the network node 20 performing the method 700.

Once the failure of its upstream node 20 or of the link to its upstream node 20 has been detected, the network node 20 performing the method 700 may propagate the notification packet in an upstream direction on its secondary path. In such a case the network node 20 performing the method 700 may transmit its own unique identifier in the notification packet (e.g., in the form of a UNP/UTN packet). Additionally, or as an alternative, the network node 20 performing the method 700 may propagate the notification packet in a downstream direction to a repair node (or multiple such repair nodes). In such a case the network node 20 performing the method 700 may transmit the unique identifier of the repair in the notification packet (e.g., in the form of a DNP/DTN packet).

As will be appreciated, the method embodiment illustrated in FIG. 7 may be preceded by a learning phase in which the unique identifiers of the individual network nodes 20 are propagated among the network nodes 20. It will be the responsibility of the multicast routing protocol to protect the unique identifiers transmitted in the learning phase against any attacks. The learning phase may also comprise a repair node discovery procedure.

Figure 8:
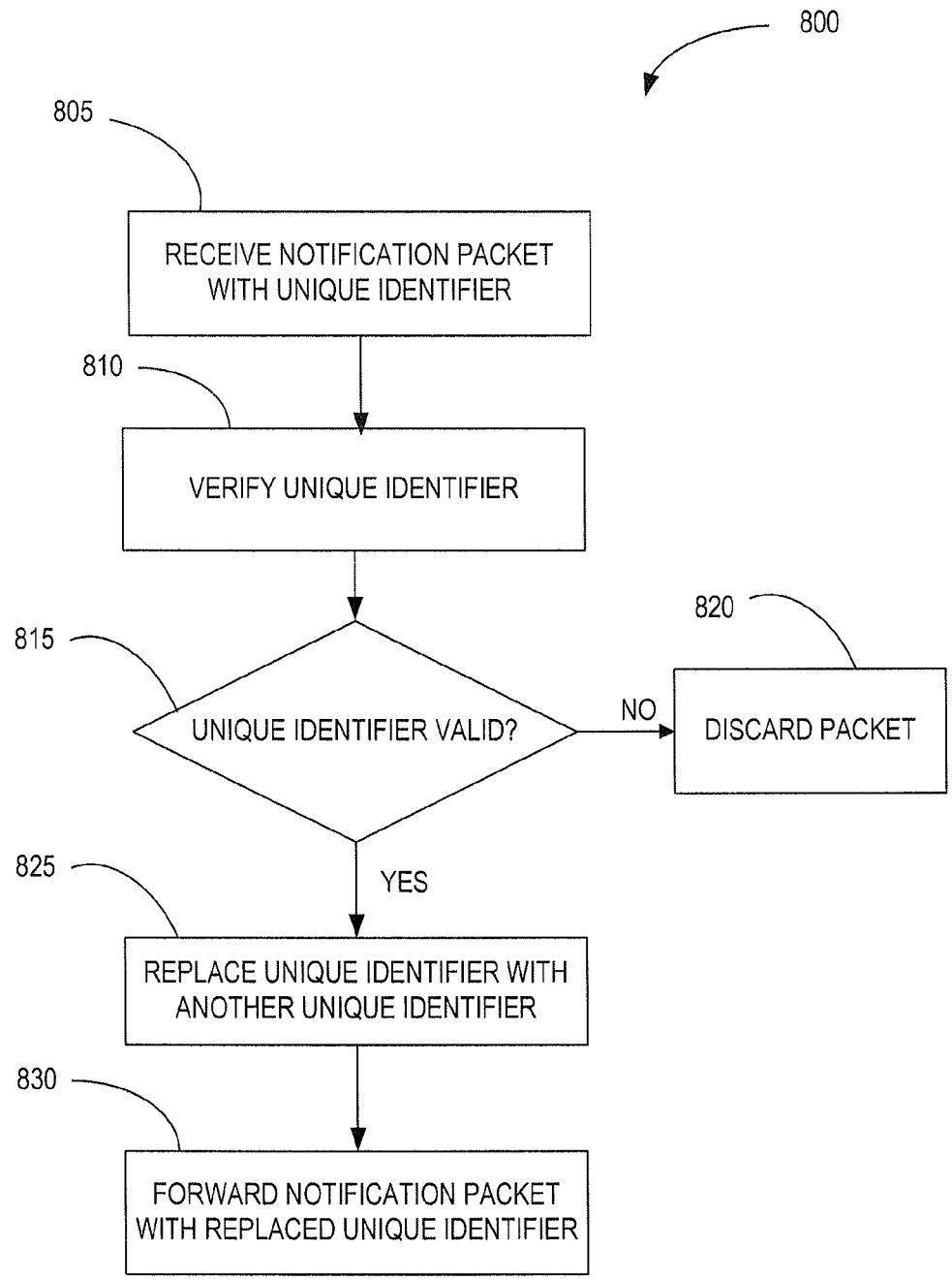
FIG. 8 illustrates an exemplary method according to an embodiment of the present disclosure.

FIG. 8 illustrates a further exemplary method 800 according to one embodiment of the present disclosure. The exemplary method 800 may be performed in combination with the exemplary method 700 illustrated in FIG. 7. In particular, the exemplary method 800 may be performed by a network node 20 that receives the notification packet generated in block 715 and propagated in block 720 (see block 805).

As has been explained above, the unique identifier included in the received notification packet may be the unique identifier associated with the network node 20 generating the notification packet in block 715, the network node receiving the notification packet in block 805, or another network node 20 (e.g., further downstream of the network node 20 receiving the notification packet in block 805).

In block 810 the unique identifier included in the received notification packet is verified. If it is determined that the identifier is not valid (block 815), the notification packet is discarded (block 820). Otherwise, the identifier in the received notification packet is replaced with another unique identifier (block 825) before being forwarded to a further network node 20 (block 830).

It should be noted that in case the notification packet received in block 805 is signed or encrypted, the exemplary method 800 could optionally include checking the signature or encryption (similar to block 160 of the exemplary method 150 of FIG. 3). Likewise, the exemplary method 800 could optionally include at least one of signing and encrypting the notification packet with the replaced unique identifier prior to the forwarding block 830 (e.g., similar to block 185 in the exemplary method 150).

The network node 20 performing the exemplary method 800 may be arranged upstream or downstream of the network node 20 performing the exemplary method 700 from the perspective of a multicast tree. As will be appreciated, the attributes upstream and downstream in the multicast tree are defined by the direction from a content source towards content recipients of the multicast transmission. It will further be appreciated that the term multicast as used herein also comprises broadcast.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method of informing nodes in a communications network about changes in a state of the communications network using notification packets; wherein, responsive to a state change, the communications network is reconfigured using a fast reroute protocol; the method comprising:
   generating, upon a state change, a notification packet, wherein generating the notification packet includes adding a first unique identifier to the notification packet, wherein the first unique identifier comprises an arbitrary number different for each notification packet so as to ensure that the content of the notification packet is unique to avoid replay attacks in which replayed notification packets are injected into the communications network; and
   propagating the notification packet through the communications network.

2. The method of claim 1, wherein the first unique identifier is different for each notification packet.

3. The method of claim 1, wherein each network node in the communications network has its own first unique identifier.

4. The method of claim 3, wherein the first unique identifier is replaced at every hop.

5. The method of claim 3, further comprising keeping the first unique identifiers of neighboring network nodes.

6. The method of claim 3, further comprising communicating with neighboring nodes to exchange or synchronize the first unique identifiers.

7. The method of claim 6, wherein:
dedicated network node areas are defined in the communications network;
each network node communicates with other network nodes in the same area to exchange or synchronize the first unique identifiers.

8. The method of claim 1, further comprising at least one of:
signing the notification packet; and
encrypting the notification packet.

9. The method of claim 1, wherein the notification packet comprises a header and a payload, wherein the first unique identifier is included in the payload.

10. The method of claim 9, wherein the payload further includes a node identifier different from the first unique identifier.

11. The method of claim 10, wherein the node identifier identifies a network node that generates, signs, or encrypts the notification packet.

12. The method of claim 1, wherein:
each network node has its own first unique identifier;
the first unique identifier added to the notification packet is the first unique identifier of the network node generating the notification packet.

13. The method of claim 1, wherein:
each network node has its own first unique identifier;
the first unique identifier added to the notification packet is the unique identifier of another network node.

14. The method of claim 1, further comprising communicating with other nodes to exchange or synchronize the first unique identifiers among the nodes.

15. A method of informing nodes in a communications network about changes in a state of the communications network using notification packets; wherein, responsive to a state change, the communications network is reconfigured using a fast reroute protocol; the method comprising:
a first network node receiving, from a second network node, a notification packet, wherein the notification packet includes a first unique identifier, wherein the first unique identifier comprises an arbitrary number different for each notification packet so as to ensure that the content of the notification packet is unique to avoid replay attacks in which replayed notification packets are injected into the communications network;
the first network node verifying the first unique identifier contained in the notification packet, and discarding the received notification packet if the first unique identifier is not valid; and
if the first unique identifier is valid, the first network node replacing the first unique identifier in the received notification packet with a second unique identifier and forwarding the notification packet to a third network node.

16. The method of claim 15:
wherein the received notification packet is at least one of signed and encrypted by the second network node;
further comprising verifying at least one of a signature and an encryption of the second network node and discarding the received notification packet if at least one of the signature and the encryption is not valid.

17. The method of claim 15, wherein:
each network node has its own unique identifier;
the first unique identifier is associated with the second network node and the second unique identifier is associated with the first network node.

18. The method of claim 15, wherein:
each network node has its own unique identifier;
the first unique identifier is associated with the first network node and the second unique identifier is associated with the third network node.

19. A non-transitory computer readable medium containing executable program code for informing nodes in a communications network about changes in a state of the communications network using notification packets; wherein, responsive to a state change, the communications network is reconfigured using a fast reroute protocol; the executable program code comprising instructions which, when executed by one or more processing circuits of the communications network, causes the communications network to:
generate, upon a state change, a notification packet, wherein generating the notification packet includes adding a first unique identifier to the notification packet, wherein the first unique identifier comprises an arbitrary number different for each notification packet so as to ensure that the content of the notification packet is unique to avoid replay attacks in which replayed notification packets are injected into the communications network; and
propagate the notification packet through the communications network.

20. A non-transitory computer readable medium containing executable program code for informing nodes in a communications network about changes in a state of the communications network using notification packets; wherein, responsive to a state change, the communications network is reconfigured using a fast reroute protocol; the executable program code comprising instructions which, when executed by one or more processing circuits of a first network node of the communications network, causes the first network node to:
receive, from a second network node, a notification packet, wherein the notification packet includes a first unique identifier, wherein the first unique identifier comprises an arbitrary number different for each notification packet so as to ensure that the content of the notification packet is unique to avoid replay attacks in which replayed notification packets are injected into the communications network;
verify the first unique identifier contained in the notification packet, and discarding the received notification packet if the first unique identifier is not valid; and
if the first unique identifier is valid, replace the first unique identifier in the received notification packet with a second unique identifier and forward the notification packet to a third network node.

21. A network node adapted to inform nodes in a communications network about changes in a state of the communications network using notification packets; wherein, responsive to a state change, the communications network is reconfigured using a fast reroute protocol; the network node comprising:

one or more processing circuits configured to cause the network node to:
   generate, upon a state change; a notification packet, wherein generating the notification packet includes adding a first unique identifier to the notification packet, wherein the first unique identifier comprises an arbitrary number different for each notification packet so as to ensure that the content of the notification packet is unique to avoid replay attacks in which replayed notification packets are injected into the communications network; and
   propagate the notification packet through the communications network.

22. A first network node adapted to inform other nodes in a communications network about changes in a state of the communications network using notification packets; wherein, responsive to a state change, the communications network is reconfigured using a fast reroute protocol; the first network node comprising:
   one or more processing circuits configured to cause the first network node to:
     receive, from a second network node, a notification packet, wherein the notification packet includes a first unique identifier, wherein the first unique identifier comprises an arbitrary number different for each notification packet so as to ensure that the content of the notification packet is unique to avoid replay attacks in which replayed notification packets are injected into the communications network;
     verify the first unique identifier contained in the notification packet;
     discard the received notification packet if the first unique identifier is not valid; and
     if the first unique identifier is valid, replace the first unique identifier in the received notification packet with a second unique identifier and forward the notification packet to a third network node.

23. A network system in a communications network, wherein, responsive to a state change, the communications network is reconfigured using a fast reroute protocol; the network system comprising:
   a first network node adapted to inform nodes in the communications network about changes in a state of the communications network using notification packets; the first network node comprising one or more processing circuits configured to cause the first network node to:
     generate, upon a state change; a notification packet, wherein generating the notification packet includes adding a first unique identifier to the notification packet, wherein the first unique identifier comprises an arbitrary number different for each notification packet so as to ensure that the content of the notification packet is unique to avoid replay attacks in which replayed notification packets are injected into the communications network; and
     propagate the notification packet through the communications network;
   a second network node adapted to inform other nodes in a communications network about changes in a state of the communications network using notification packets; the second network node comprising one or more processing circuits configured to cause the second network node to:
     receive the notification packet from the first network node;
     verify the first unique identifier contained in the notification packet;
     discard the received notification packet if the first unique identifier is not valid; and
     if the first unique identifier is valid, replace the first unique identifier in the received notification packet with a second unique identifier and forward the notification packet to a third network node.

* * * * *